(12) United States Patent
Park

(10) Patent No.: US 8,208,682 B2
(45) Date of Patent: Jun. 26, 2012

(54) IMAGE DETECTION APPARATUS AND METHOD

(75) Inventor: Bo-gun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 11/965,863

(22) Filed: Dec. 28, 2007

(65) Prior Publication Data

US 2009/0034875 A1   Feb. 5, 2009

(30) Foreign Application Priority Data

Aug. 2, 2007   (KR) ........................ 10-2007-0077813

(51) Int. Cl.
| | |
|---|---|
| G06K 9/00 | (2006.01) |
| G06K 9/34 | (2006.01) |
| G06K 9/46 | (2006.01) |
| G06K 9/66 | (2006.01) |
| G06K 9/62 | (2006.01) |
| G06K 9/32 | (2006.01) |
| G06K 9/36 | (2006.01) |
| G06K 9/40 | (2006.01) |
| G06K 1/00 | (2006.01) |
| G06K 15/02 | (2006.01) |
| H04N 5/225 | (2006.01) |
| H04N 9/04 | (2006.01) |
| H04N 5/217 | (2006.01) |
| H04N 7/01 | (2006.01) |
| H04N 11/20 | (2006.01) |
| H04N 1/40 | (2006.01) |
| G06F 15/00 | (2006.01) |
| G06F 17/00 | (2006.01) |
| G06T 1/00 | (2006.01) |

(52) U.S. Cl. ........ 382/100; 382/173; 382/191; 382/224; 382/254; 382/280; 382/293; 348/207.99; 348/241; 348/441; 358/1.2; 358/445; 345/418

(58) Field of Classification Search ............. 348/207.99, 348/240.99, 241, 441–459; 358/1.2, 445; 345/418, 427, 606
See application file for complete search history.

(56) References Cited

U.S. PATENT DOCUMENTS 6,904,180 B1 * 6/2005 Gallagher .................... 382/280
(Continued)

FOREIGN PATENT DOCUMENTS

JP   2002374502 A   12/2002
(Continued)

OTHER PUBLICATIONS

A.C. Popescu, and H. Farid, "Statistical Tools for Digital Forensics", in Proc. the 6th International Workshop on Information Hiding, Toronto, Canada, May 2004.*

(Continued)

*Primary Examiner* — Anand Bhatnagar
*Assistant Examiner* — Nathan Bloom
(74) *Attorney, Agent, or Firm* — Sughrue Mion, PLLC

(57) ABSTRACT

Provided is an apparatus and method for detecting an image enhanced from a low resolution image to a high resolution image. An apparatus detects an image converted from a first resolution to a higher second resolution. A frequency converter converts a received second resolution image signal to a frequency domain. An image determiner calculates energy per frequency from the received second resolution image signal. If an amount of energy in over a pre-set frequency is less than a threshold, the received second resolution image signal corresponds to a second resolution image converted from a first resolution image, and if the amount of energy in over the pre-set frequency is greater than the threshold, determining that the received second resolution image signal corresponds to a real second resolution image.

13 Claims, 6 Drawing Sheets

U.S. PATENT DOCUMENTS

| | | | | |
|---|---|---|---|---|
| 7,616,237 | B2* | 11/2009 | Fridrich et al. | 348/241 |
| 7,720,288 | B2* | 5/2010 | Luo et al. | 382/191 |
| 2004/0028285 | A1* | 2/2004 | Jung et al. | 382/261 |
| 2004/0246262 | A1* | 12/2004 | Nichogi et al. | 345/582 |

FOREIGN PATENT DOCUMENTS

| | | |
|---|---|---|
| JP | 2003143439 A | 5/2003 |
| KR | 1020070056713 A | 6/2007 |

OTHER PUBLICATIONS

Tian-Tsong Ng. Statistical and Geometric Methods for Passive-blind Image Forensics. PhD Thesis Graduate School of Arts and Sciences, Columbia University, May 2007.*

H. T. Sencar and N. Memon. Overview of State-of-the-art in Digital Image Forensics. World Scientific Press Conference, Proceedings, Sep. 25, 2007.*

Kirchner, M. Fast and reliable resampling detection by spectral analysis of fixed linear predictor residue. Proceedings of the 10th ACM workshop on Multimedia and security MMSec 08, Sep. 2008.*

Babak Mandian and Stanislav Saic, "Detection and description of geometrically transformed digital images", Proc. SPIE 7254, 72540J (Jan. 2009); doi:10.1117/12.805898.*

A. C. Gallagher. Detection of linear and cubic interpolation in JPEG compressed images. In Proceedings of the Second Canadian Conference on Computer and Robot Vision, 65-72, May 2005.*

Hongmei Gou; Swaminathan, A.; Min Wu; , "Noise Features for Image Tampering Detection and Steganalysis," Image Processing, 2007. ICIP 2007. IEEE International Conference on , vol. 6, no., pp. VI-97-VI-100, Sep. 16, 2007-Oct. 19, 2007.*

S.Prasad and K. Ramakrishnan. On resampling detection and its application to detect image tampering. In Proceedings of the 2006 IEEE International Conference on Multimedia and EXPO, 1325-1328, Jul. 2006.*

Mandian, B.; Saic, S.; , "On Periodic Properties of Interpolation and Their Application to Image Authentication," Information Assurance and Security, 2007. IAS 2007. Third International Symposium on , vol., no., pp. 439-446, Aug. 29-31, 2007.*

Sutcu, Y.; Coskun, B.; Sencar, H.T.; Memon, N.; , "Tamper Detection Based on Regularity of Wavelet Transform Coefficients,"Image Processing, 2007. ICIP 2007. IEEE International Conference on , vol. 1, no., pp.I-397-I-400, Sep. 16, 2007-Oct. 19, 2007.*

Non-Final Rejection issued Aug. 24, 2011 by the Korean Intellectual Property Office in counterpart Korean Patent Application No. 1020070077813.

Communication issued on Mar. 6, 2012 by the Korean Patent Office in the counterpart Korean Patent Application No. 10-2007-0077813.

* cited by examiner

IMAGE DETECTION APPARATUS AND METHOD

CROSS-REFERENCE TO RELATED PATENT APPLICATION

This application claims the benefit of Korean Patent Application No. 10-2007-0077813, filed on Aug. 2, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to an image detection, and more particularly, to an apparatus and method for detecting an image converted from a first resolution to a second resolution higher than the first resolution in a digital video device.

2. Description of the Related Art

The development of compression technology for audio and video signals has aided the rapid transition of broadcasting systems from analog to a digital. Digital broadcasting video signals can be categorized as Standard Definition (SD) image signals and High Definition (HD) image signals according to their resolution, and each country adopts the SD and/or HD image signal according to its digital broadcast policy. High image quality can be achieved when the HD image signal is used as compared to the SD image signal. As the adoption of digital broadcasting increases, HD images converted from various sources are broadcasted. Images captured by various broadcasting devices, such as HD cameras, SD cameras, and HD camcorders, are converted to HD image and transmitted. There are two types of HD image signals transmitted by broadcasting stations: real HD image signals and HD image signals converted from image source captured using an SD method.

The generation of HD image from SD image is achieved using a scaling or up-converting method using an interpolation filter. For example, from 480i or 480p-SD image, 1080i, 1080p, or 720p-HD image is generated. If SD image is interleaved image, the interleaved image is scaled after progressive conversion is performed, or after a top field and a bottom field are separately scaled without the progressive conversion, interleaved image is generated. In this case, HD image converted from SD image has a different image characteristic from a real HD image signal because of source acquisition and editing and has more severe artifacts than the real HD image signal. In more detail, this is due to a resolution decrease and low compression rate image storing of a capturing device, editing and scaling using a composite device, or up-converting. In this case, MPEG artifacts, such as blocking, more severe than real HD image exist in converted HD image, and an artifact, such as dot-crawl or cross-color, or a format conversion error exists. Thus, in any case, gradation and detail of the converted HD image decreases compared to the real HD image due to the resolution decrease. Since viewers who view image through a display device are sensitive to artifacts, the necessity to improve image quality of HD image converted from SD image by removing the artifacts is increasing. However, when artifacts are removed, a side effect such as a decrease in detail of real HD image inevitably occurs.

SUMMARY OF THE INVENTION

In order to solve the problems described above, quality of an image converted from a first resolution to a second resolution higher than the first resolution must be improved. Thus, the present invention provides an image detection apparatus and method for separately detecting an image converted from the first resolution to the second resolution higher than the first resolution and a real image having the second resolution.

According to an aspect of the present invention, there is provided an apparatus for detecting an image converted from a first resolution to a second resolution higher than the first resolution, the apparatus comprising: a frequency converter which converts a received second resolution image signal to a frequency domain; and an image determiner which calculates energy per frequency from the converted second resolution image signal, and determines whether the received second resolution image signal, input to the frequency converters, corresponds to a second resolution image converted from a first resolution image using the calculation result.

The image determiner may, if an amount of energy in a pre-set frequency is less than a threshold, determine that the received second resolution image signal corresponds to a second resolution image converted from a first resolution image, and if the amount of energy in the pre-set frequency is greater than the threshold, determining that the received second resolution image signal does not correspond to the second resolution image converted from the first resolution image.

The conversion to the frequency domain may be performed using one of a Discrete Fourier Transform (DFT), a Fast Fourier Transform (FFT), a Discrete Cosine Transform (DCT), and a Wavelet Transform.

The image signal having the first resolution may be a Standard Definition (SD) image signal, and the image signal having the second resolution may be a High Definition (HD) image signal.

According to another aspect of the present invention, there is provided an apparatus for detecting an image converted from a first resolution to a second resolution higher than the first resolution, the apparatus comprising: a texture area determiner dividing a received second resolution image into areas having a pre-set size and determining a texture area using frequency characteristic information of each area; a metric calculator calculating a predetermined metric indicating an energy ratio in a predetermined frequency band from area characteristic information in the texture area; and an image determiner determining by comparing the metric and a predetermined threshold whether the received second resolution image is a second resolution image converted from a first resolution image.

The area characteristic information may include area class information for determining whether each area is a texture area including texture information and frequency characteristic information.

The texture area determiner may comprise: a frequency converter converting the received second resolution image signal to a frequency domain; an energy calculator calculating energy of the image signal in the frequency domain; and an area classifier classifying a current area as a texture area including texture information if the calculated energy is greater than a predetermined threshold.

The frequency conversion may be performed using Discrete Cosine Transform (DCT).

The metric calculator may calculate the metric by obtaining a ratio of energy of a predetermined frequency band to total energy in the texture area.

The image determiner may determine that the received second resolution image is a second resolution image converted from a first resolution image if the metric is less than a predetermined threshold, and determine that the received second resolution image is a real second resolution image if the metric is greater than the predetermined threshold.

According to another aspect of the present invention, there is provided a method of detecting an image converted from a first resolution to a second resolution higher than the first resolution, the method comprising: converting a received second resolution image signal to a frequency domain; and calculating energy per frequency from the converted second resolution image signal, and determining whether the received second resolution image signal corresponds to a second resolution image converted from a first resolution image using the calculation result.

According to another aspect of the present invention, there is provided a method of detecting an image converted from a first resolution to a second resolution higher than the first resolution, the method comprising: dividing a received second resolution image to areas having a pre-set size and determining a texture area using frequency characteristic information of each area; calculating a predetermined metric indicating an energy ratio in a predetermined frequency band from area characteristic information in the texture area; and determining by comparing the metric and a predetermined threshold whether the received second resolution image is a second resolution image converted from a first resolution image.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

The present invention will be described in detail by explaining exemplary embodiments of the invention with reference to the attached drawings.

Figure 1:
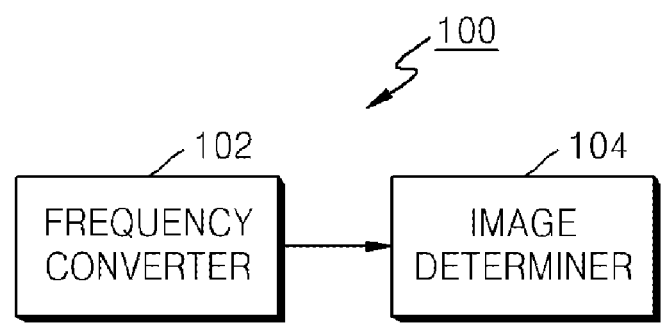
FIG. 1 is a block diagram of an image detection apparatus according to an embodiment of the present invention.

FIG. 1 is a block diagram of an image detection apparatus 100 according to an embodiment of the present invention.

Referring to FIG. 1, the image detection apparatus 100 can detect an image converted from a first resolution to a second resolution higher than the first resolution from among input image signals. The image detection apparatus 100 includes a frequency converter 102 and an image determiner 104. If the second resolution image signal is inputted from a broadcasting station, the frequency converter 102 converts the received second resolution image signal to a frequency domain, and the image determiner 104 calculates energy per frequency from the received second resolution image signal converted to the frequency domain, and if an amount of energy in over a pre-set frequency is less than a threshold, determines that the received second resolution image signal corresponds to a second resolution image converted from a first resolution image, and if the amount of energy in over the pre-set frequency is greater than the threshold, determines that the received second resolution image signal corresponds to a real second resolution image, i.e., the received second resolution image signal does not correspond to a second resolution image converted from the first resolution image.

The conversion to the frequency domain in the frequency converter 102 is performed using one of a Discrete Fourier Transform (DFT), a Fast Fourier Transform (FFT), a Discrete Cosine Transform (DCT), and a Wavelet Transform.

Figure 2:
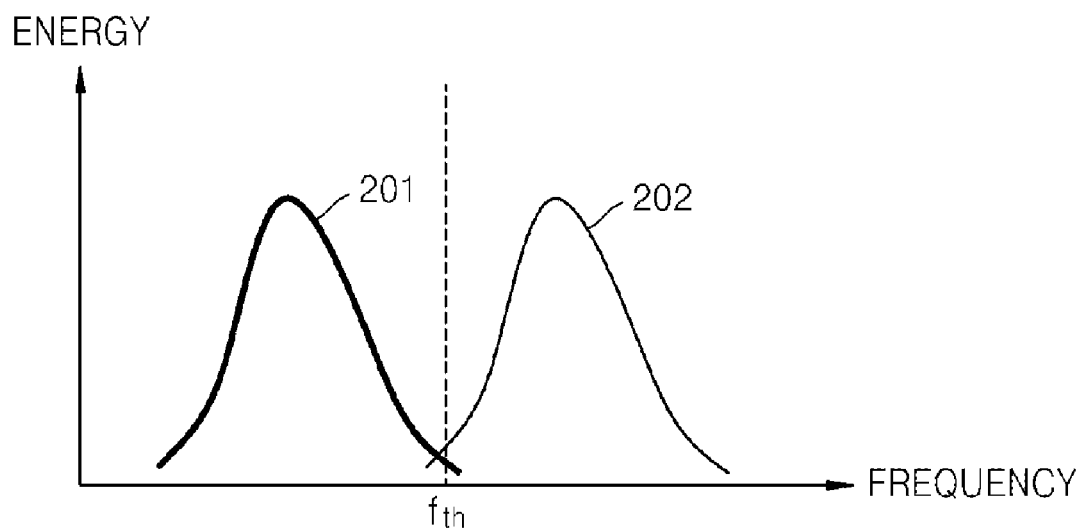
FIG. 2 is a graph showing signals obtained by converting input High Definition (HD) image signals to a frequency domain.

FIG. 2 is a graph showing signals obtained by converting input High Definition (HD) image signals to the frequency domain. In FIG. 2, the horizontal axis indicates the frequency domain, and the vertical axis indicates energy of each image signal. The symbol $f_{th}$ indicates a threshold frequency obtained in experiments. Referring to FIG. 2, a signal 201 obtained by converting an HD image signal converted from an SD image signal to the frequency domain is shown in the left of the threshold frequency, i.e. a low frequency band, and a signal 202 obtained by converting a real HD image signal to the frequency domain is shown in the right of the threshold frequency, i.e. a high frequency band. If the converted frequency is lower than the threshold frequency, i.e., in a relatively low frequency band, the image determiner 104 determines that the signal corresponds to an HD image converted from an SD image, and if the converted frequency is higher than the threshold frequency, i.e., in a relatively high frequency band, the image determiner 104 determines that the signal corresponds to a real HD image. An HD image signal converted from an SD image signal is located in a relatively low frequency band since an interpolation filter acts as a low pass filter during an up-scaling process of converting an SD image to an HD image, in which a frequency of the converted HD image signal is relatively lowered. The image determiner 104 also calculates energy per frequency in an image signal converted to the frequency domain. That is, the image determiner 104 calculates an amount of energy in over a pre-set frequency, i.e. a high frequency band. In this case, if the amount of energy is less than a predetermined threshold, the image determiner 104 determines that the signal corresponds to an HD image converted from an SD image, and if the amount of energy is greater than the predetermined threshold, the image determiner 104 determines that the signal corresponds to a real HD image, i.e., the signal does not correspond to an HD image converted from an SD image. Even in this case, the same pattern illustrated in FIG. 2 is shown. As described above, the determination of whether an image is an HD image converted from an SD image is not limited to the illustrations described above and can be applied to the determination of whether an image is a high resolution image converted from a low resolution image.

Figure 3:
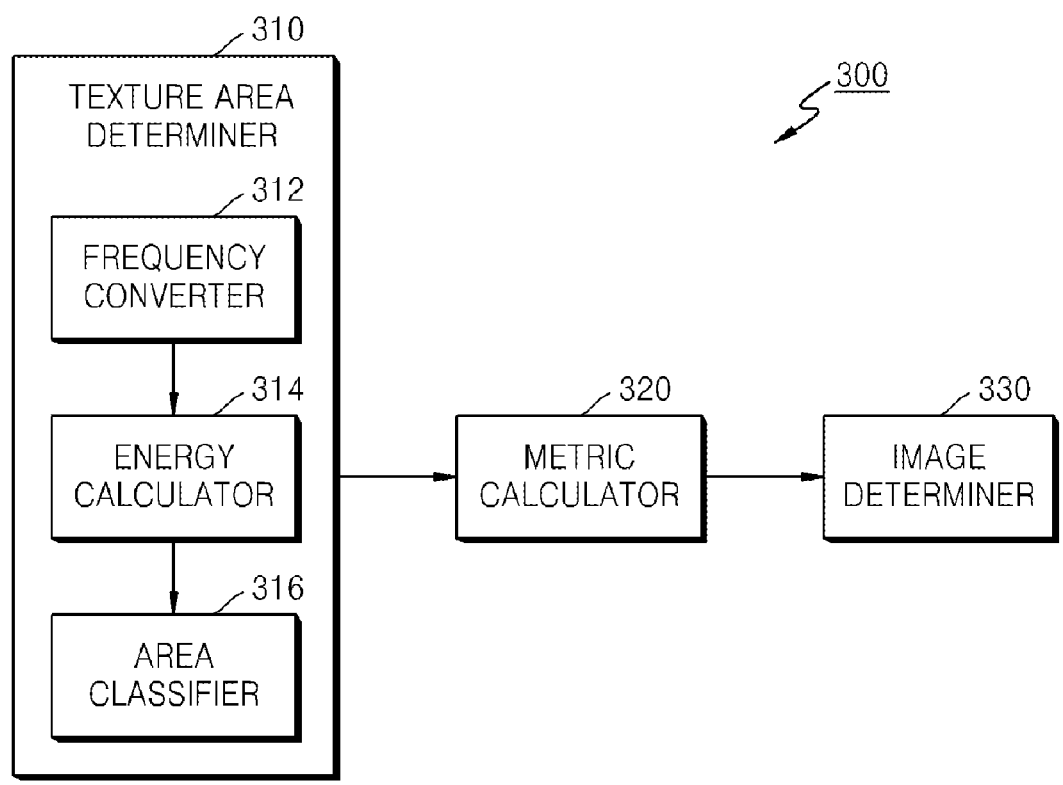
FIG. 3 is a block diagram of an image detection apparatus according to another embodiment of the present invention.

FIG. 3 is a block diagram of an image detection apparatus 300 according to another embodiment of the present invention.

Referring to FIG. 3, the image detection apparatus 300 can detect an image converted from a first resolution to a second resolution higher than the first resolution from among input image signals. The image detection apparatus 300 includes a texture area determiner 310, a metric calculator 320, and an image determiner 330. The texture area determiner 310 can include a frequency converter 312, an energy calculator 314, and an area classifier 316. If a second resolution image signal is inputted from a broadcasting station, the texture area determiner 310 divides the received second resolution image to areas having a pre-set size and determines a texture area using frequency characteristic information of each area. The metric calculator 320 calculates a metric indicating an energy ratio in a predetermined frequency band from area characteristic information in the texture area. The image determiner 330 determines by comparing the metric and a predetermined threshold whether the received second resolution image is a second resolution image converted from a first resolution image or a real second resolution image. In the texture area determiner 310, the frequency converter 312 converts the received second resolution image signal to the frequency domain, the energy calculator 314 calculates energy of the received second resolution image signal in the frequency domain, and the area classifier 316 classifies the received second resolution image signal as a texture area including texture information if the calculated energy is greater than a predetermined threshold.

The area characteristic information extracted by the texture area determiner 310 includes area class information for determining whether each area is a texture area including texture information and frequency characteristic information. The frequency converter 312 frequency-converts the received second resolution image signal. In an exemplary embodiment, an image is divided into predetermined areas, and Discrete Cosine Transform (DCT) is performed for each area. For example, 4×4 DCT or 8×8 DCT can be performed. The energy calculator 314 calculates energy using a DCT coefficient value obtained by performing DCT.

$$E_T = E_H + E_L \quad \text{(Equation 1)}$$

In Equation 1, $E_T$ denotes total energy, $E_H$ denotes energy obtained by experiments in a predetermined frequency band, i.e. high frequency energy, and $E_L$ denotes energy obtained by excluding the predetermined frequency band, i.e. low frequency energy. The area classifier 316 classifies an area mainly having high frequency energy as a texture area and an area mainly having low frequency energy as a non-texture area (hereinafter, smooth area).

$$RC = \begin{cases} \text{TEXTURE,} & \text{if } E_H/E_T > ER_{TH} \\ \text{SMOOTH,} & \text{otherwise} \end{cases} \quad \text{(Equation 2)}$$

In Equation 2, RC denotes an area class, $ER_{TH}$ denotes a threshold obtained by experiments. Referring to Equation 2, if $E_H/E_T$ is greater than the threshold, i.e., if a current area is an area mainly having high frequency energy, the area classifier 316 classifies the current area as a texture area, and if $E_H/E_T$ is equal to or less than the threshold, the area classifier 316 classifies the current area as a smooth area. In general, in the texture area, high frequency energy of a real high resolution image has a greater value than that of a high resolution image converted from a low resolution image.

The metric calculator 320 calculates a metric $M_{HD}$ using the energy of the predetermined frequency band in the texture area classified by the texture area determiner 310. The metric $M_{HD}$ can be calculated by using Equation 3.

$$M_{HD} = \sum_{n=1}^{N} E_H(n)/E_T(n) \quad \text{(Equation 3)}$$

In Equation 3, n denotes an index of an area in an image, $E_T(n)$ denotes total energy of an $n^{th}$ area in a texture area, $E_H(n)$ denotes energy of a predetermined high frequency band of the $n^{th}$ area (i.e., high frequency energy), and N denotes the number of total texture areas. In Equation 3, the metric $M_{HD}$ can be obtained by adding ratios of energy of frequency components to total energy for all areas classified as a texture area.

Figure 4:
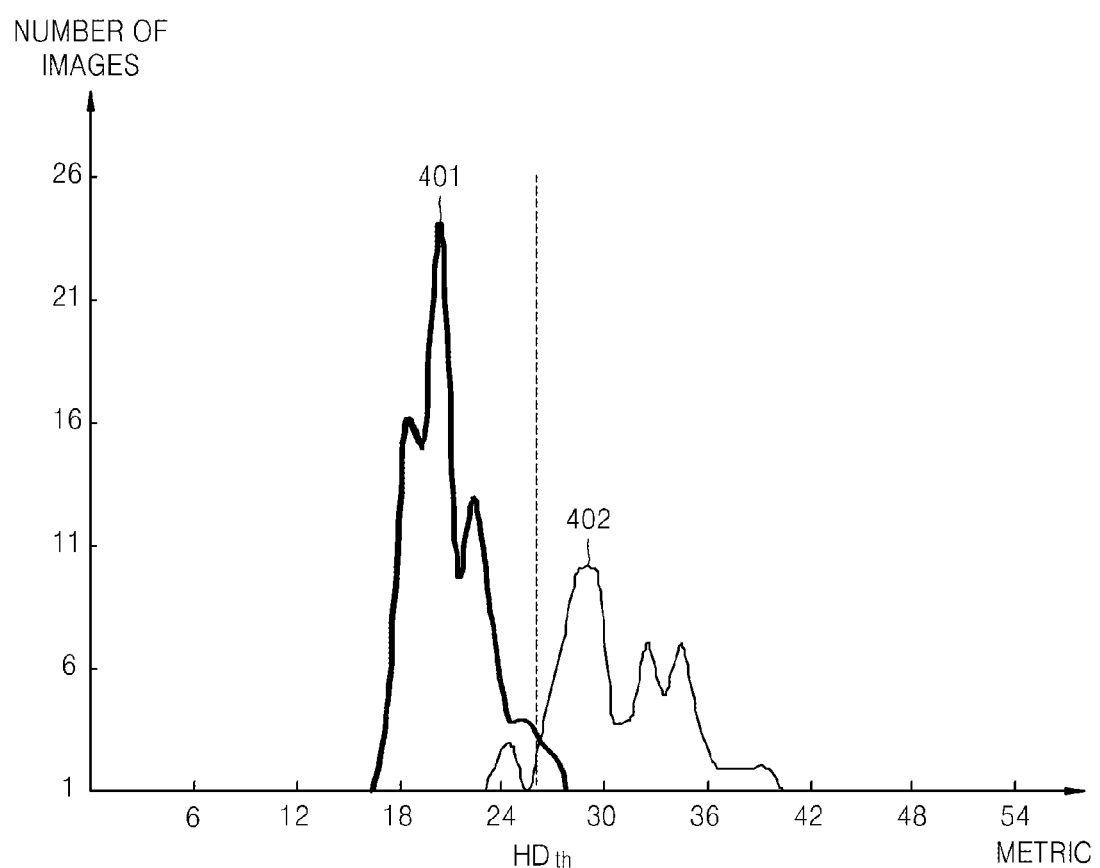
FIG. 4 is a graph showing metric distributions of an HD image converted from a Standard Definition (SD) image and a real HD image.

The image determiner 330 compares the metric obtained by the metric calculator 320 and a predetermined threshold and determines whether the second resolution image is a second resolution image converted from a first resolution image. FIG. 4 is a graph showing metric distributions of an HD image converted from an SD image and a real HD image. In FIG. 4, the horizontal axis indicates a metric value, the vertical axis indicates the number of images including a corresponding metric, and $HD_{th}$ indicates a threshold obtained by experiments. Referring to FIG. 4, a metric distribution 401 of an HD image converted from an SD image is biased in the left in which each metric value is lower than the threshold $HD_{th}$, and a metric distribution 402 of a real HD image is biased in the right. Thus, a metric value of a real HD image is greater than that of an HD image converted from an SD image.

$$SD \to HD \text{ Flag} = \begin{cases} 0, & \text{if } M_{HD} > HD_{th} \\ 1, & \text{otherwise} \end{cases} \quad \text{(Equation 4)}$$

According to Equation 4, a Flag is determined. In the case where SD→HD Flag=1, i.e., in the case where $M_{HD} < HD_{th}$, a corresponding image is a second resolution image converted from a first resolution image. Thus, the image determiner 330 can detect the second resolution image converted from the first resolution image.

Thus, if it is determined that the image is an image converted from the first resolution to the second resolution greater than the first resolution, image quality can be enhanced by removing an MPEG artifact, such as blocking, an artifact, such as dot crawl or cross-color, or an up-conversion error.

Figure 5:
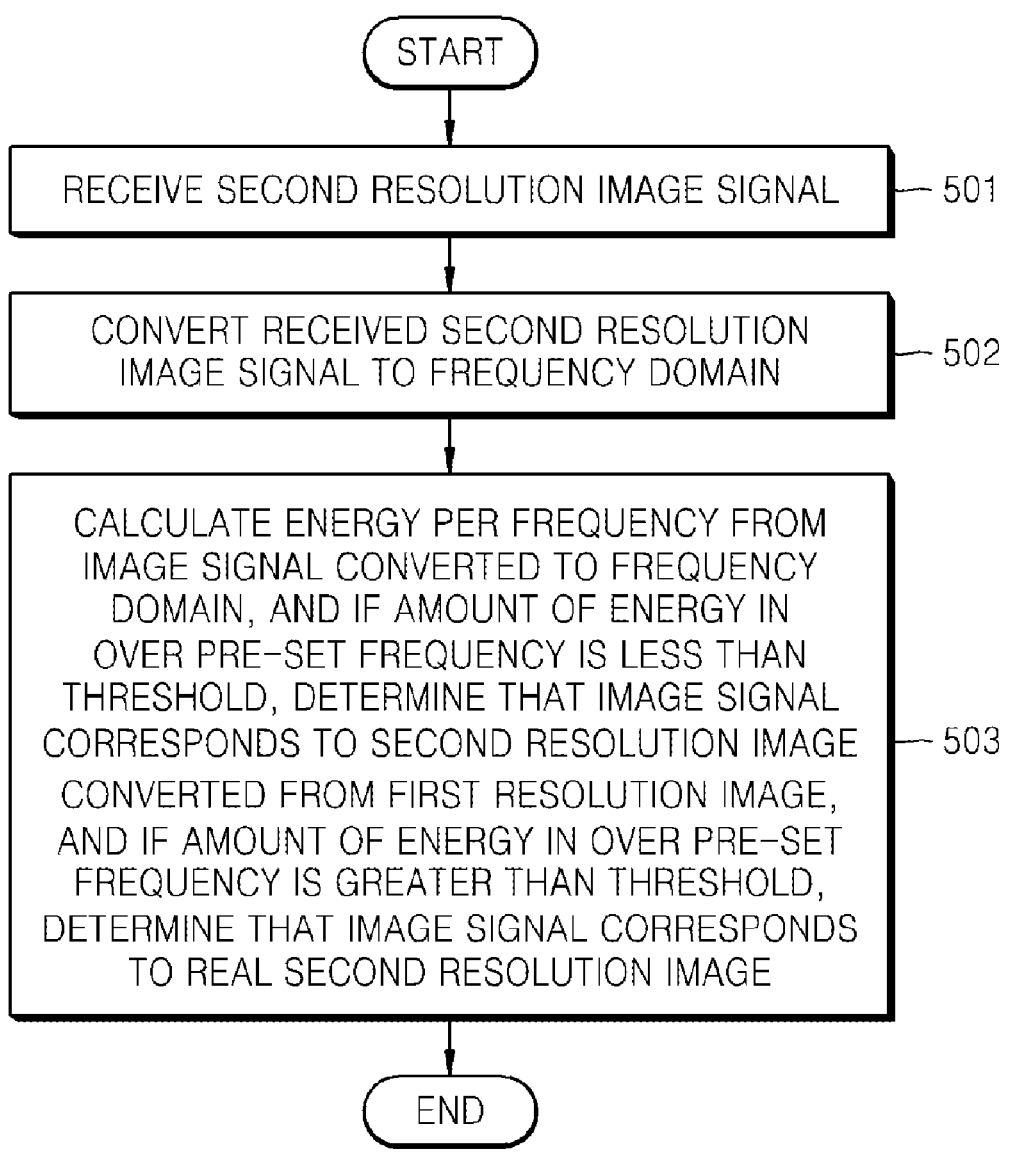
FIG. 5 is a flowchart of a method of detecting an image converted from a first resolution to a second resolution higher than the first resolution according to an embodiment of the present invention.

FIG. 5 is a flowchart of a method of detecting an image converted from a first resolution to a second resolution higher than the first resolution according to an embodiment of the present invention.

Referring to FIG. 5, in operation 501, an image detection apparatus receives a second resolution image signal from a broadcasting station. The second resolution image signal may be a real second resolution image signal or a second resolution image signal converted by up-converting a first resolution image signal, the second resolution higher than the first resolution.

In operation 502, the image detection apparatus converts the received second resolution image signal to the frequency domain. The conversion to the frequency domain is performed using one of DFT, FFT, DCT, and Wavelet Transform.

In operation 503, the image detection apparatus calculates energy per frequency from the received second resolution image signal converted to the frequency domain, and if an amount of energy in over a pre-set frequency is less than a threshold, determines that the received second resolution image signal corresponds to a second resolution image converted from a first resolution image, and if the amount of energy in over the pre-set frequency is greater than the threshold, determines that the received second resolution image signal corresponds to a real second resolution image. The threshold can be obtained by experiments.

Figure 6:
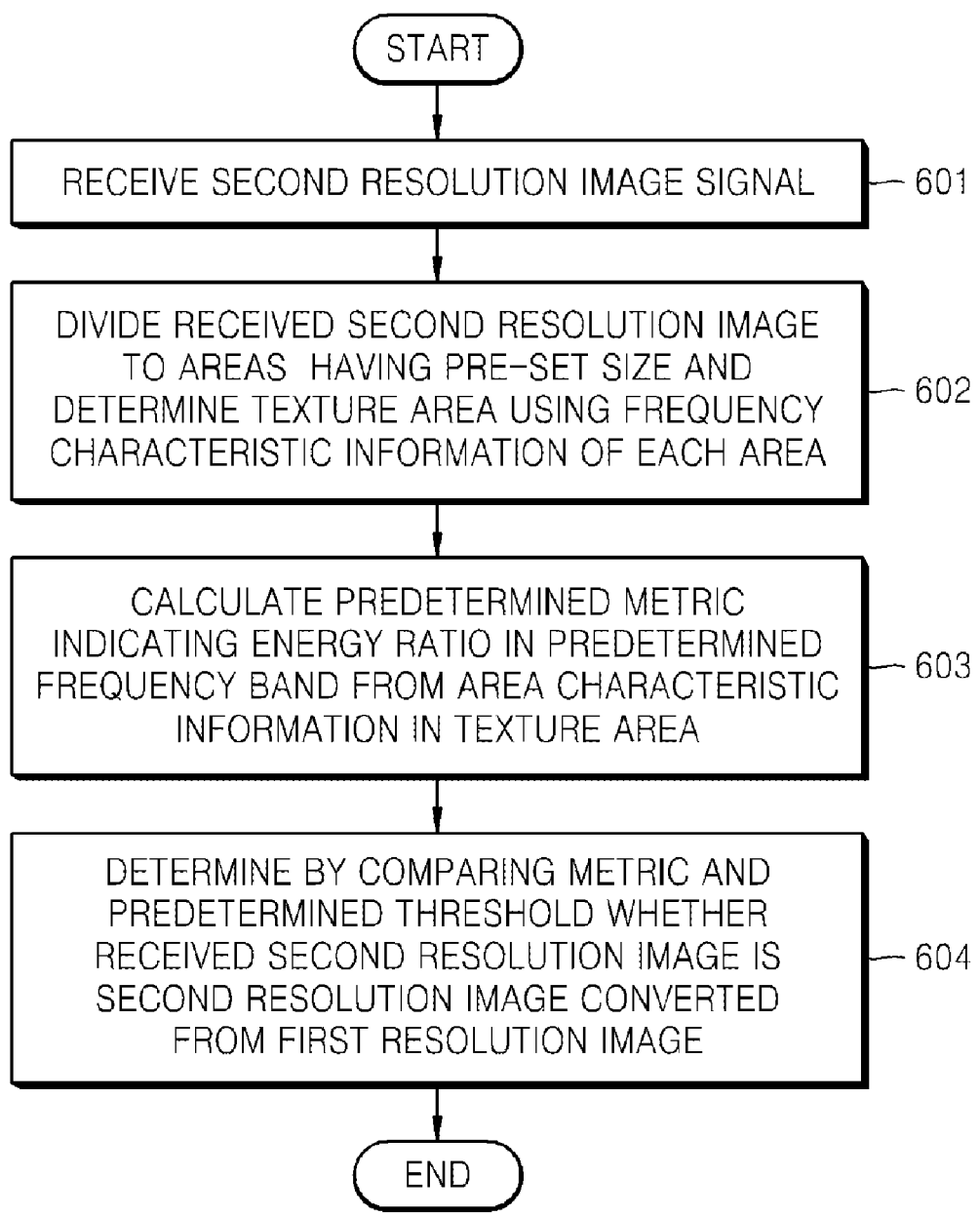
FIG. 6 is a flowchart of a method of detecting an image converted from a first resolution to a second resolution higher than the first resolution according to another embodiment of the present invention.

FIG. 6 is a flowchart of a method of detecting an image converted from a first resolution to a second resolution higher than the first resolution according to another embodiment of the present invention.

Referring to FIG. 6, in operation 601, an image detection apparatus receives a second resolution image signal.

In operation 602, the image detection apparatus divides the received second resolution image to areas having a pre-set size and determines a texture area using frequency characteristic information of each area. The area characteristic information includes area class information for determining whether each area is a texture area including texture information and frequency characteristic information.

In operation 603, the image detection apparatus calculates a predetermined metric indicating an energy ratio in a predetermined frequency band from the area characteristic information in the texture area. Each metric value is calculated by obtaining energy in only the texture area.

In operation 604, the image detection apparatus determines by comparing the metric and a predetermined threshold whether the received second resolution image is a second resolution image converted from a first resolution image. A metric distribution of the second resolution image converted from the first resolution image is biased in the left in which each metric value is relatively lower than the threshold, and a metric distribution of a real second resolution image is biased in the right.

Figure 7:
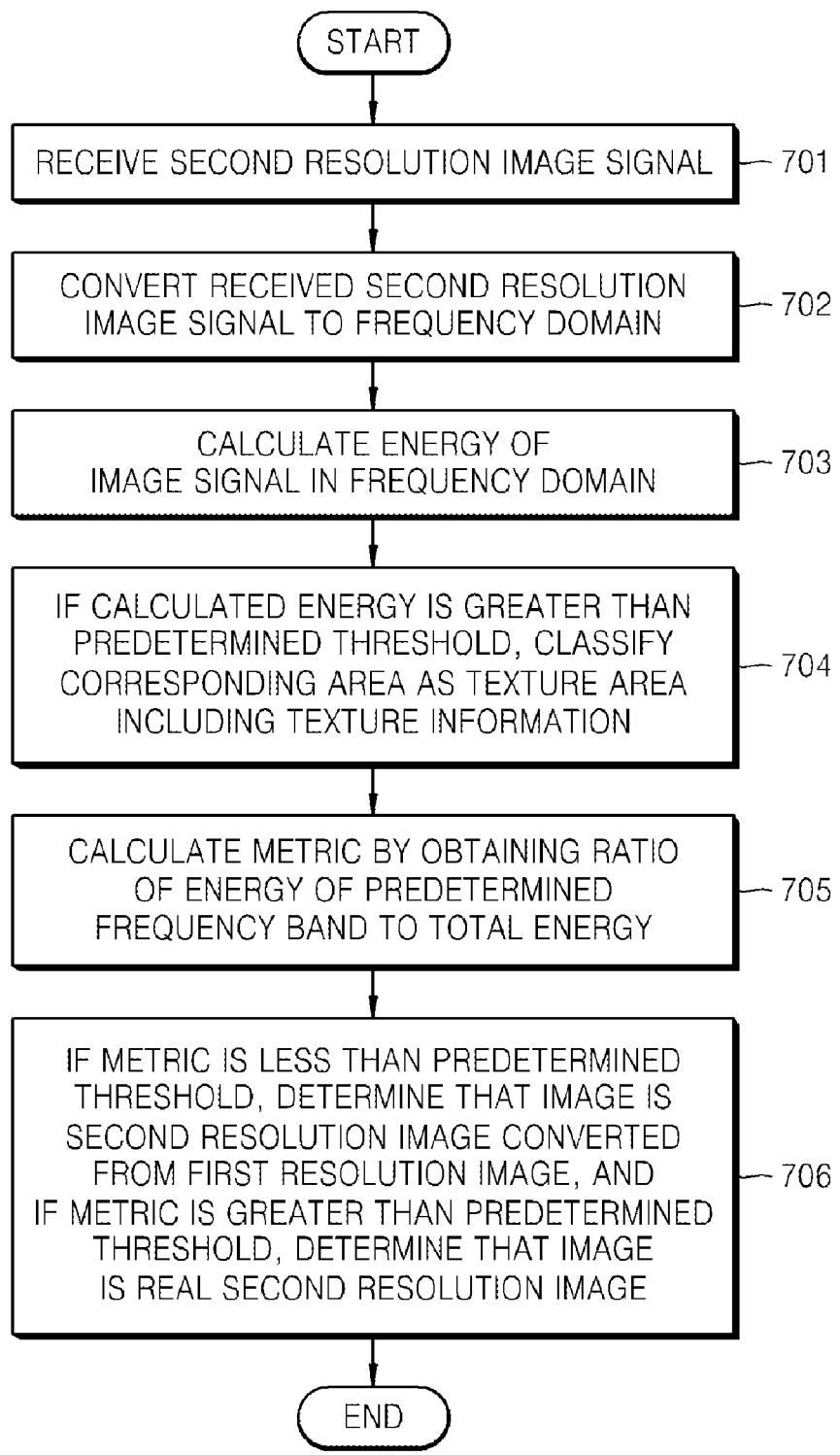
FIG. 7 is a flowchart of a method of detecting an image converted from a first resolution to a second resolution higher than the first resolution according to another embodiment of the present invention.

FIG. 7 is a flowchart of a method of detecting an image converted from a first resolution to a second resolution higher than the first resolution according to another embodiment of the present invention.

Referring to FIG. 7, in operation 701, an image detection apparatus receives a second resolution image signal.

In operation 702, the image detection apparatus converts the received second resolution image signal to the frequency domain. In an exemplary embodiment, an image is divided into predetermined areas, and 4×4 DCT or 8×8 DCT is performed for each area.

In operation 703, the image detection apparatus calculates energy of the received second resolution image signal in the frequency domain using a DCT coefficient value obtained by performing DCT.

In operation 704, if the calculated energy is greater than a predetermined threshold, the image detection apparatus classifies a corresponding area as a texture area including texture information.

In operation 705, the image detection apparatus calculates a metric by obtaining a ratio of energy of a predetermined frequency band to total energy.

In operation 706, if the metric is less than a predetermined threshold, the image detection apparatus determines that the received second resolution image is a second resolution image converted from a first resolution image, and if the metric is greater than the predetermined threshold, the image detection apparatus determines that the received second resolution image is a real second resolution image.

As described above, according to the present invention, an image converted from a first resolution to a second resolution greater than the first resolution and a real second resolution image can be classified, and by separately processing image quality of the converted second resolution image and the real second resolution image, final image quality can be improved.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for detecting an image converted from a first resolution to a second resolution higher than the first resolution, the apparatus comprising:
   a texture area determiner which divides a received second resolution image into areas having a pre-set size and which determines a texture area using frequency characteristic information of an area;
   a metric calculator which calculates a metric indicating an energy ratio in a frequency band from area characteristic information in the texture area; and
   an image determiner which determines by comparing the metric and a threshold whether the received second resolution image is a second resolution image converted from a first resolution image.

2. The apparatus of claim 1, wherein the area characteristic information includes area class information for determining whether the area is the texture area, including texture information and frequency characteristic information.

3. The apparatus of claim 1, wherein the texture area determiner comprises:
   a frequency converter which converts a signal of the received second resolution image to a frequency domain;
   an energy calculator which calculates energy of the converted second resolution image signal; and
   an area classifier which classifies the area as the texture area including texture information if the calculated energy is greater than a threshold.

4. The apparatus of claim 3, wherein the frequency converter converts the signal of the received second resolution image to the frequency domain using Discrete Cosine Transform (DCT).

5. The apparatus of claim 1, wherein the metric calculator calculates the metric by obtaining a ratio of energy of a frequency band to total energy in the texture area.

6. The apparatus of claim 1, wherein the image determiner determines that the received second resolution image is the second resolution image converted from the first resolution image if the metric is less than a threshold, and determines that the received second resolution image is not the second resolution image converted from the first resolution image if the metric is greater than the threshold.

7. The apparatus of claim 6, wherein the first resolution image is a Standard Definition (SD) image, and the second resolution image is a High Definition (HD) image signal.

8. A method of detecting an image converted from a first resolution to a second resolution higher than the first resolution, the method comprising:
   dividing a received second resolution image into areas having a pre-set size and determining a texture area using frequency characteristic information of an area;

calculating a metric indicating an energy ratio in a frequency band from area characteristic information in the texture area; and determining by comparing the metric and a threshold whether the received second resolution image is a second resolution image converted from a first resolution image.

9. The method of claim 8, wherein the determining of the texture area comprises:

converting the received second resolution image signal to a frequency domain;

calculating energy of the converted second resolution image signal; and classifying the area as the texture area including texture information if the calculated energy is greater than a threshold.

10. The method of claim 9, wherein the converting the received second resolution image signal to the frequency domain is performed using Discrete Cosine Transform (DCT).

11. The method of claim 10, wherein the calculating of the metric comprises calculating the metric by obtaining a ratio of energy of a frequency band to total energy in the texture area.

12. The method of claim 11, wherein the determining comprises determining that the received second resolution image is a second resolution image converted from a first resolution image if the metric is less than a threshold, and determining that the received second resolution image is a real second resolution image if the metric is greater than the threshold.

13. The method of claim 8, wherein the first resolution image is a Standard Definition (SD) image, and the second resolution image is a High Definition (HD) image.

* * * * *